US008794939B2

(12) United States Patent
Cheron et al.

(10) Patent No.: US 8,794,939 B2
(45) Date of Patent: Aug. 5, 2014

(54) FUEL PUMP HEAD HAVING AN EXTERNAL CHAMBER

(75) Inventors: Antonin Cheron, Fleury les Aubrais (FR); Paul Buckley, Rainham (GB); Miguel G Calvo, Maidstone (GB)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 399 days.

(21) Appl. No.: 13/054,128

(22) PCT Filed: Jul. 13, 2009

(86) PCT No.: PCT/GB2009/050834

§ 371 (c)(1), (2), (4) Date: Jan. 14, 2011

(87) PCT Pub. No.: WO2010/007409

PCT Pub. Date: Jan. 21, 2010

(65) Prior Publication Data

US 2011/0120418 A1 May 26, 2011

(30) Foreign Application Priority Data

Jul. 15, 2008 (GB) .................................. 0812888.6

(51) Int. Cl.
*F04B 39/10* (2006.01)
*F16K 15/06* (2006.01)

(52) U.S. Cl.
USPC ............................ 417/570; 137/541; 137/542

(58) Field of Classification Search
USPC ........................... 417/569, 570; 137/541, 542
See application file for complete search history.

(56) References Cited

U.S. PATENT DOCUMENTS

| | | | | |
|---|---|---|---|---|
| 507,901 | A * | 10/1893 | Grist | 137/540.11 |
| 6,406,272 | B2 * | 6/2002 | Ruthardt et al. | 417/273 |
| 6,568,927 | B1 | 5/2003 | Guentert | |
| 7,178,787 | B2 * | 2/2007 | Gilbert et al. | 251/337 |
| 7,363,913 | B2 * | 4/2008 | Dutt et al. | 123/450 |
| 2004/0234404 | A1 * | 11/2004 | Vicars | 417/571 |

FOREIGN PATENT DOCUMENTS

| | | |
|---|---|---|
| DE | 10 2006 017 036 | 10/2007 |
| EP | 1 473 461 | 11/2004 |
| EP | 1 707 799 | 10/2006 |
| EP | 1 770 274 | 4/2007 |
| WO | 00/39450 | 7/2000 |

OTHER PUBLICATIONS

Japan Office Action dated Jul. 19, 2012.
GB Search Report dated Dec. 3, 2008.
International Search Report dated Oct. 27, 2009.

* cited by examiner

*Primary Examiner* — Charles Freay
(74) *Attorney, Agent, or Firm* — Mark H. Svoboda

(57) ABSTRACT

A pump head suitable for use in a fuel pump for a common rail fuel injection system, comprises a pump head housing defining a plunger bore and a pumping chamber. Fuel is pressurized within the pumping chamber by a plunger reciprocating within the plunger bore. The pump head housing includes an inlet valve arrangement for controlling fuel flow into the pumping chamber. The inlet valve arrangement includes a valve member movable between open and closed positions in response to fuel pressure within a gallery. The gallery communicates with an external chamber defined by a closure member externally mounted to the pump head housing. In use, the gallery communicates with a source of low-pressure fuel via the external chamber. The pump head housing has a projection which locates the closure member on the pump head housing.

18 Claims, 6 Drawing Sheets

FUEL PUMP HEAD HAVING AN EXTERNAL CHAMBER

TECHNICAL FIELD

The invention relates to high-pressure fuel pumps for use in common rail fuel injection systems for supplying high-pressure fuel to an internal combustion engine, and in particular to an improved pump head for use in such fuel pumps. The invention has particular application in compression ignition (diesel) engines.

BACKGROUND ART

High-pressure fuel pumps for common rail fuel injection systems typically comprise one or more hydraulic pump heads where fuel is pressurised in a pumping chamber of the pump head by the reciprocating movement of a plunger. Typically, low-pressure fuel is fed to the pump heads by a low-pressure lift pump in the fuel tank, or alternatively by a transfer pump built into the high-pressure fuel pump. Once pressurised, the high-pressure fuel is fed from the pumping chamber to the common rail.

A known pump head of a high-pressure fuel pump is shown in FIG. 1. The known pump head includes a pump head housing 10 having an upper portion 12 and a downwardly extending plunger support tube 14. A pumping plunger 16 is reciprocal within a plunger bore 18 defined partly within the upper portion 12 of the pump head housing 10 and partly within the plunger support tube 14. The pumping plunger 16 is driven by a cam 20 mounted on a drive shaft 22 driven by the engine. The pumping chamber 24 is defined within the upper portion 12 of the pump head housing 10, at an upper end 26 of the plunger bore 18. Low-pressure fuel is supplied to the pumping chamber 24 along an entry drilling 28 in the upper portion 12. Fuel is pressurised within the pumping chamber 24 by the reciprocating movement of the pumping plunger 16 within the plunger bore 18, and high-pressure fuel exits the pumping chamber 24 along an exit drilling 30 in the upper portion 12.

An inlet valve arrangement 32 is located above the pumping chamber 24 (in the orientation shown on the page). The inlet valve arrangement 32 is shown more clearly in the enlarged view of FIG. 1*a*. Referring now to FIG. 1*a*, the inlet valve arrangement 32 is mounted within an inlet valve bore 34, which is defined in the upper portion 12 of the pump head housing 10, coaxial with the plunger bore 18. The inlet valve arrangement 32 includes an inlet valve body 36, a lower surface 38 of which is adjacent to an annular end wall 40 of the inlet valve bore 34 surrounding the upper end of the pumping chamber 24. The inlet valve body 36 is loaded against the annular end wall 40 by a screw cap 42 that engages a threaded portion 44 of an inner wall of the inlet valve bore 34. A moveable inlet valve member 46, guided within a valve bore 48 defined in the inlet valve body 36, controls fuel flow into the pumping chamber 24 in response to fuel pressure within a gallery 50 defined in the inlet valve body 36. Low-pressure fuel is supplied to the gallery 50 through a plurality of radial feed drillings 52 in the inlet valve body 36. The radial feed drillings 52 communicate with the entry drilling 28 via a feeding annulus 54, which is defined within the upper portion 12 of the pump head housing 10, between the inlet valve body 36 and an inner wall 56 of the inlet valve bore 34. The feeding annulus 54 may be machined either in the pump head housing 10 or in the inlet valve body 36, or is sometimes split between both. An O-ring 58 is located between the screw cap 42 and the inner wall 56 of the inlet valve bore 34 to provide a low-pressure seal between the low-pressure fuel in the feeding annulus 54 and the exterior of the pump head housing 10. An annular protrusion 60 on the lower surface 38 of the inlet valve body 36 abuts the annular end wall 40 of the inlet valve bore 34 to form a high-pressure ("knife edge") seal between high- and low-pressure regions. As an alternative to the annular protrusion 60, a metal washer is sometimes used to form this high-pressure seal.

The inlet valve arrangement 32 shown in FIGS. 1 and 1*a* is usually assembled as a sub-assembly. A large clamping load is applied to the inlet valve body 36 by the screw cap 42 in order to generate the high-pressure seal 60 between the high and low-pressure regions. A disadvantage of these known pump heads is that the high pressure sealing feature 60 induces high local contact pressure in a region susceptible to stresses from high-pressure fuel. In addition, the high-pressure seal 60 requires precise tightening of the screw cap 42, which can be difficult to achieve consistently. Alternative designs of pump head employ a ball valve that eliminates the need for a high-pressure seal. However, ball valves are not guided, which limits the high speed/high flow performance capabilities of these pump heads.

Another known pump head design is shown in U.S. Pat. No. 7,363,913. The pump head removes the need for a high pressure seal between high and low regions of the pump head as the feeding annulus occupies a position external to the pump head housing, and receives fuel at low pressure directly from an entry drilling. However, despite this benefit, the pump head has other disadvantages. For example, the pump head housing has a large pocket machined in its upper surface to define the feeding chamber. A projection of the pump head housing body extends into the feeding chamber and radial drillings provided in this projection define flow paths for fuel past the valve seat and into the pumping chamber when the inlet valve arrangement is open. From a manufacturing perspective the housing is difficult to machine due to its complex formation, particularly due to the requirement for the pocket in the upper surface of the pump head housing and the projection that extends into this pocket. The provision of drillings in the projection also reduces the rigidity of the housing.

It is an aim of the present invention to provide a high performance pump head that overcomes the above problems associated with known designs.

SUMMARY OF THE INVENTION

According to a first aspect of the invention, there is provided a pump head for a fuel pump for use in a common rail fuel injection system, the pump head comprising a pump head housing, a pumping chamber defined within the pump head housing, and an inlet valve arrangement for controlling fuel flow into the pumping chamber. The inlet valve arrangement includes a valve member moveable between open and closed positions in response to fuel pressure within a gallery. The gallery communicates with an external chamber defined by a closure member mounted externally to the pump head housing, such that, in use, the gallery communicates with a source of low-pressure fuel via the external chamber. The pump head housing includes a projection which is received within the closure member to locate the closure member on the pump head housing.

The provision of the projection on the pump head housing to locate the closure member provides several advantages. The radially outer surface of the projection may engage with a radially inner surface of the closure member to locate the closure member on the projection. This enables an O-ring seal to be located in a groove provided in the radially outer surface of the projection to provide a seal against fuel flow out of the external chamber. In addition, the projection provides a large volume of material in which to form drillings to define one or more flow paths between the external chamber and the gallery, without compromise to the rigidity of the structure. The projection is compatible with applications where a plurality of such flow paths are required to enable higher inlet flow rates. High flow rates are particularly desirable in the context of applications in which the pump head is required to operate at high speed and to pressurise the common rail to high pressures.

The external chamber acts in a similar way to the feeding annulus 54 of the pump head shown in FIG. 1. In a preferred embodiment of the invention, the external chamber is defined, at least in part, by a closure member in the form of a valve cap mounted to an external surface of the pump head housing. The valve cap may be substantially of a domed form, or top-hat-shaped. Positioning the chamber externally of the pump head housing facilitates manufacture of the pump head because there is no need to machine the feeding annulus into the pump head housing or into an inlet valve body.

The valve member preferably engages with a valve seat defined by the valve bore to control fuel flow between the external chamber and the gallery/pumping chamber. The pump head housing may also define the gallery, and/or a fuel path between the external chamber and the gallery. The fuel path may be provided by at least one drilling in the pump head housing, which extends between the gallery and the external surface of the pump head housing, in communication with the external chamber. This arrangement negates the need for a separate valve body 36 such as that shown in FIG. 1. Consequently, the number of parts is reduced, which in turn reduces cost and facilitates assembly of the pump head. In addition, by integrating the valve body feature of known pump heads into the pump head housing itself, the potential for fuel leakage is reduced.

In a preferred embodiment of the invention, the inlet valve body feature of known pump heads is defined by the pump head housing itself, i.e. it is integrated into the pump head.

The pump head may further comprise a low-pressure supply passage for conveying low pressure fuel from the source to the external chamber, wherein the low-pressure supply passage is defined, in part, within the projection. Preferably, therefore, the low-pressure supply passage opens at an external surface of the pump head housing within the external chamber. This arrangement is particularly advantageous, because it eliminates potential leakage paths between high and low pressure regions, and hence negates the need for a high-pressure seal. By eliminating the high-pressure seal, a source of high structural stress is removed which allows for cheaper processing because there is less need for complex and costly stress-reduction geometries and surface finishes. Furthermore, the number of parts is reduced further, and manufacture and assembly consequently facilitated. In addition, higher flow rates and higher fuel pressures can be reliably achieved by the pump head, which provides improved performance.

Preferably, the valve member is guided within a valve bore defined in the pump head housing. The resulting guided valve provides high pump performance in terms of both flow and pressure.

The valve member may be biased into the closed position by a spring engaged between an end portion of the valve member and an upper surface of the projection.

In a particularly preferred embodiment, the at least one fuel path opens at the upper surface of the projection outside the diameter of the spring. This ensures the flow of fuel into the gallery (and hence the pumping chamber) from the source of low-pressure fuel does not flow through the spring, which guards against cavitation problems and results in a less restricted flow. The spring life may also be benefited by this configuration. The relatively large volume of the projection on the pump head housing facilitates this layout of the flow path(s).

It is preferable for the gallery to be defined within the pump head housing.

The invention also relates to a fuel pump for use in a common rail fuel injection system, wherein the fuel pump includes at least one pump head as set out in the first aspect of the invention.

The fuel pump may further comprise a main pump housing through which a drive shaft for the fuel pump extends, the fuel pump further comprising means for fixing the pump head to the main pump housing, said means being adapted to fix the closure member to the pump head also.

By adapting a fixing means to serve the function of both attaching the pump head to the main pump housing, and attaching the closure member to the pump head housing, the closure member arrangement can be provided on the pump without the need for additional fixing parts.

Preferably, the closure member is provided with at least one aperture for receiving a fixing of the fixing means.

By way of example, the pump head housing may be provided with a passage for receiving the fixing, the fixing extending further into the main pump housing to affix the pump head thereto.

According to a second aspect of the invention, there is provided a pump head for a fuel pump for use in a common rail fuel injection system, the pump head comprising a pump head housing, a pumping chamber defined within the pump head housing and an inlet valve arrangement for controlling fuel flow into the pumping chamber. The inlet valve arrangement includes a valve member moveable between open and closed positions in response to fuel pressure within a gallery. The gallery communicates with an external chamber defined by a closure member mounted externally to the pump head housing, such that, in use, the gallery communicates with a source of low-pressure fuel via the external chamber. A spring acts on the valve member to urge the valve member into the closed position in which fuel is unable to flow into the pumping chamber. At least one fuel path is provided between the external chamber and the gallery, wherein the at least one fuel path opens at a surface of the pump head housing outside the diameter of the spring.

As described above, this provides the advantage that the spring is not located in a direct flow path for low-pressure fuel into the pumping chamber.

According to a third aspect of the invention, there is provided a fuel pump for use in a common rail fuel injection system, the fuel pump comprising a main pump housing, a pump head having a pump head housing, a pumping chamber defined within the pump head housing and an inlet valve arrangement for controlling fuel flow into the pumping chamber. The inlet valve arrangement includes a valve member moveable between open and closed positions in response to fuel pressure within a gallery, wherein the gallery communicates with an external chamber. Closure means is mounted externally to the pump head housing to define the external chamber, whereby, in use, the gallery communicates with a source of low-pressure fuel via the external chamber. The fuel pump further comprises means for fixing the pump head to the main pump housing, said means being adapted to fix the closure means to the pump head also.

As described above, where the fixing means serves to attach the pump head to the main pump housing, and to attach the closure member to the pump head housing, the closure member arrangement can be provided on the pump without the need for additional fixing parts.

It will be appreciated that preferred and/or optional features of the first aspect of the invention may be incorporated alone or in appropriate combination in the second and third aspects of the invention also.

For the avoidance of doubt, relative terms such as 'upper' and 'lower' in the above description have been used for convenience, in order to describe the pump head in the orientation shown on the page. It should be understood that the actual orientation of the pump head will depend upon the geometry of the fuel pump, and as such these relative terms should not be interpreted as limiting the scope of the invention.

BRIEF DESCRIPTION OF THE DRAWINGS

Reference has already been made to FIGS. 1 and 1*a* of the accompanying drawings in which.

Figure 2:
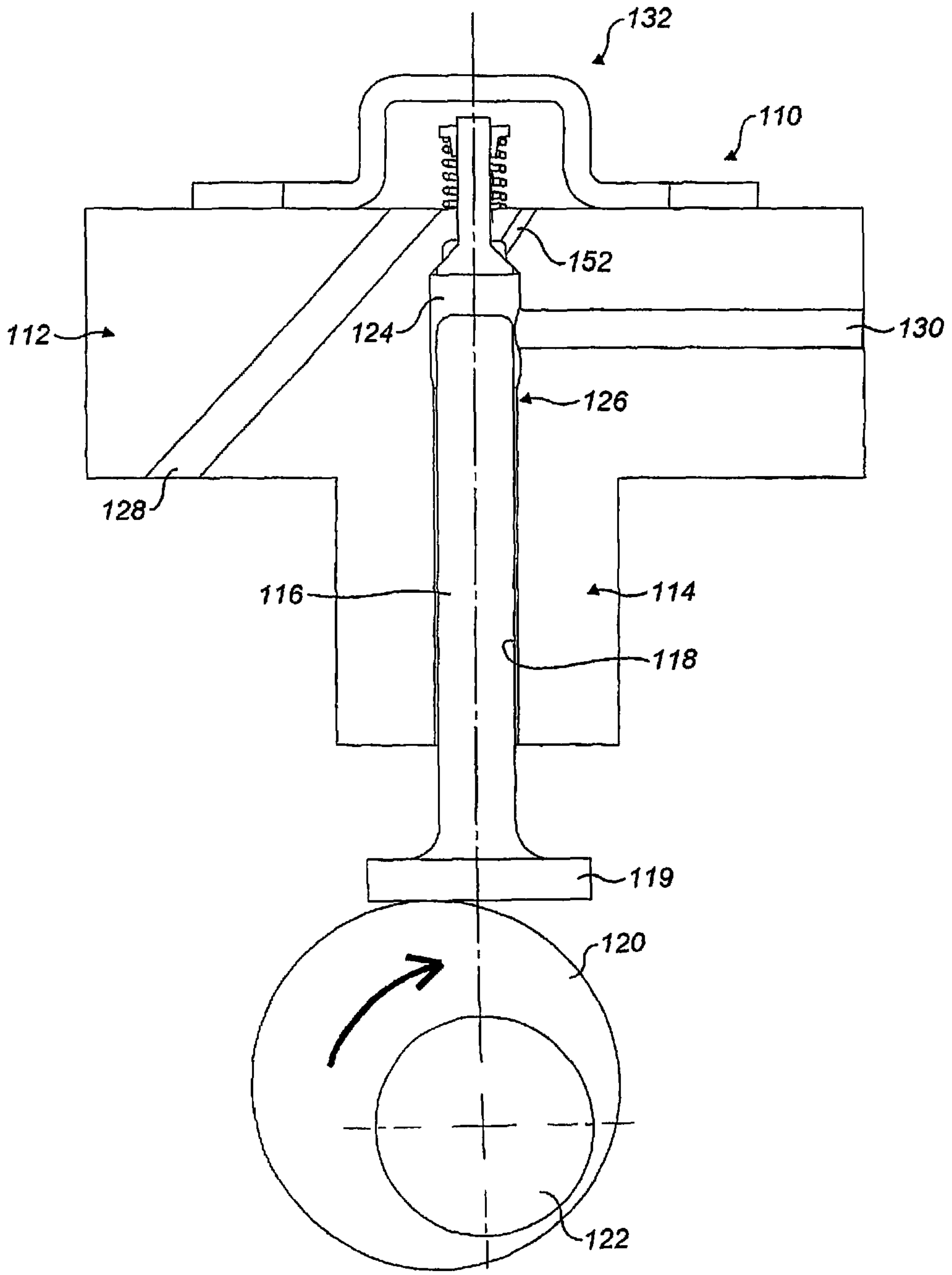
Figure 2A:
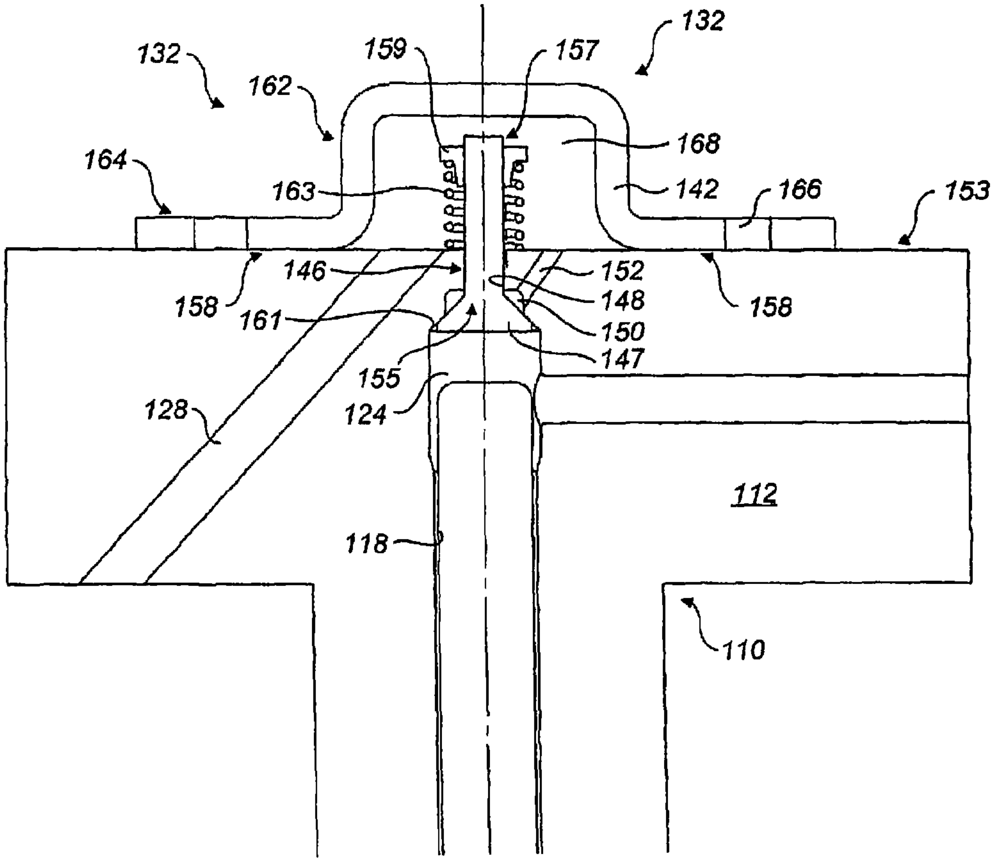
Figure 3:
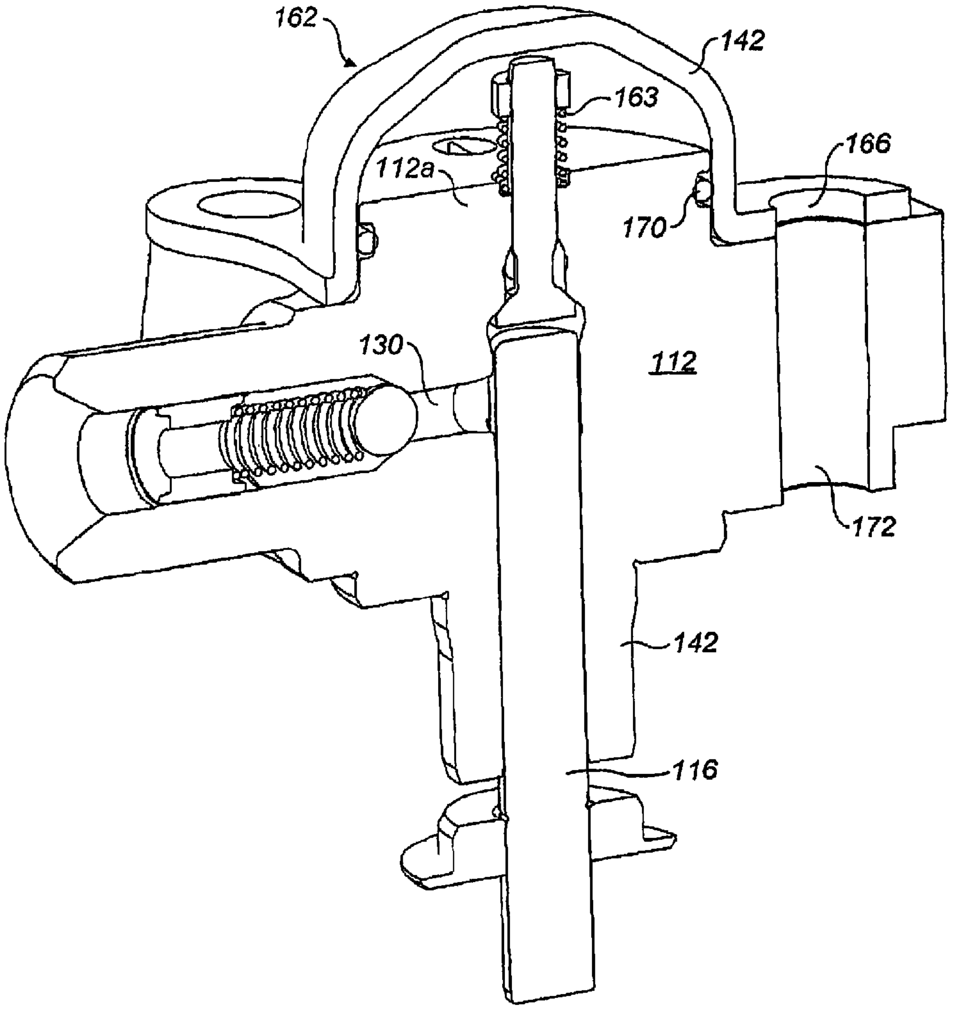
Figure 4:
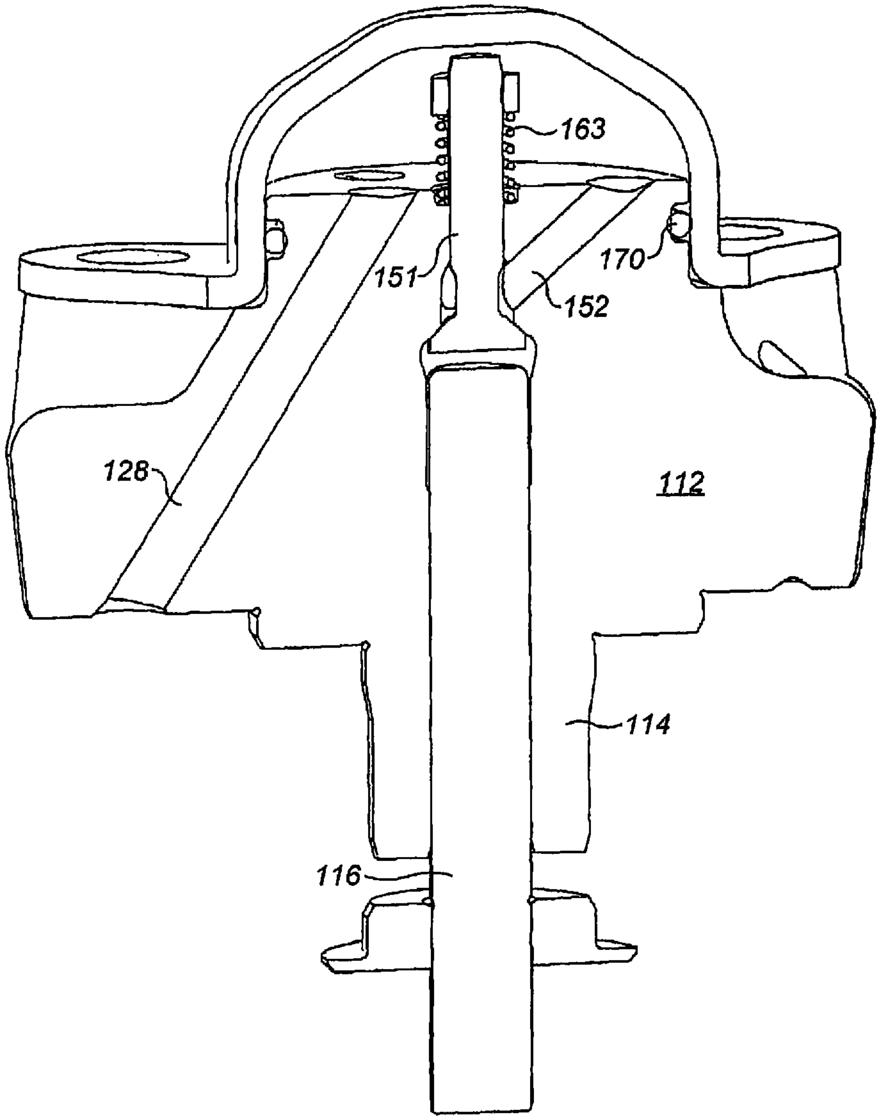

In order that the invention may be more readily understood, reference will now be made, by way of example only, to FIGS. 2 and 2*a*, in which:

FIG. 2 is a schematic cross-sectional view of a fuel pump head according to the present invention;

FIG. 2*a* is an enlarged view of an inlet valve arrangement of the pump head shown in FIG. 2;

FIG. 3 is a perspective view of an alternative embodiment of the fuel pump head of the present invention; and FIG. 4 is an alternative perspective view of the fuel pump head shown in FIG. 3.

DETAILED DESCRIPTION OF THE PREFERRED EMBODIMENTS

Referring to FIG. 2, a fuel pump head according to an embodiment of the invention has a pump head housing 110, which is generally T-shaped in cross-section, and includes an upper portion 112 and a downwardly extending plunger support tube 114. A pumping plunger 116 is located within a plunger bore 118 defined in part by the plunger support tube 114, and in part by the upper portion 112 of the pump head housing 110. The plunger 116 includes a foot 119 on its lower end, which is driven by a cam 120 mounted on a drive shaft 122. As the drive shaft 122 rotates, the cam 120 imparts an axial force to the plunger foot 119, causing the plunger 116 to reciprocate within the plunger bore 118. It will be appreciated that the as an alternative to having a plunger with an integrated foot 119, a conventional roller and shoe arrangement, or a rider and tappet arrangement, could be used instead.

The pumping plunger 116 extends into a pumping chamber 124 defined by the upper portion 112 of the pump head housing 110, at an upper end 126 of the plunger bore 118. Fuel is pressurised within the pumping chamber 124 by the reciprocal motion of the plunger 116 within the plunger bore 118. Whilst not shown in FIG. 2, low-pressure fuel is fed to the pumping chamber 124 by a low-pressure lift pump in a fuel tank, or alternatively by a transfer pump built into the high-pressure fuel pump. The upper portion 112 of the pump head housing 110 includes an exit drilling 130 in communication with the pumping chamber 124. In use, pressurised fuel is fed from the pumping chamber 124, along the exit drilling 130, and through an outlet valve (not shown), to downstream components of a fuel injection system, for example a common rail.

The fuel pump head includes an inlet valve arrangement 132, which is shown more clearly in the enlarged view of FIG. 2*a*. Referring now to FIG. 2*a*, the inlet valve arrangement 132 comprises a moveable inlet valve member 146 for controlling fuel flow into the pumping chamber 124. The inlet valve member 146 has a conical body 147 and an elongate neck 151 and is moveable between open and closed positions in response to the fuel pressure in a gallery 150, which is machined in the upper portion 112 of the pump head housing 110, above the pumping chamber 124, so as to surround a frustoconical lower end surface of the inlet valve member 146.

Figure 1:
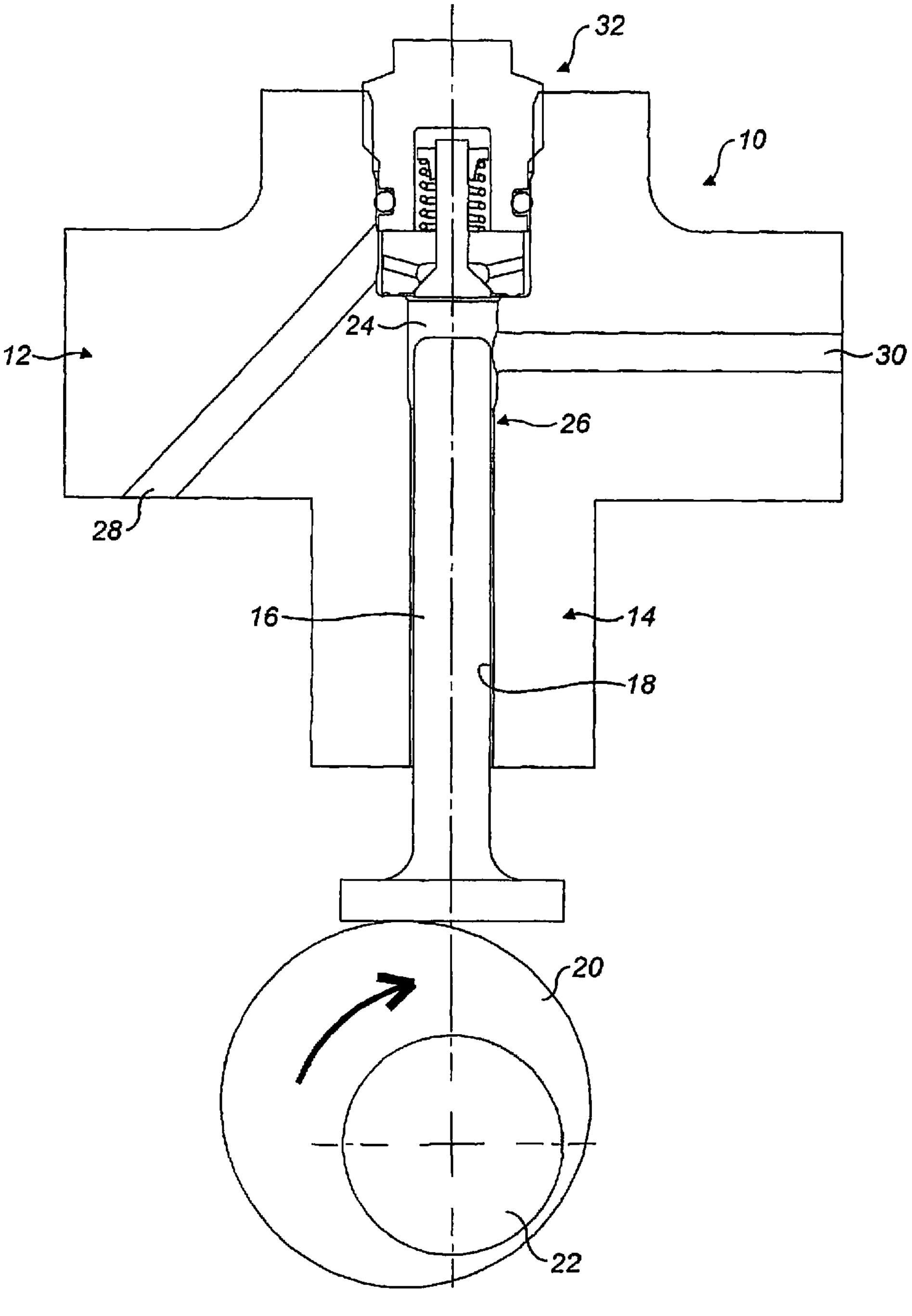
FIG. 1 PRIOR ART
FIG. 1 is a schematic cross-sectional view of a known fuel pump head.
Figure 1A:
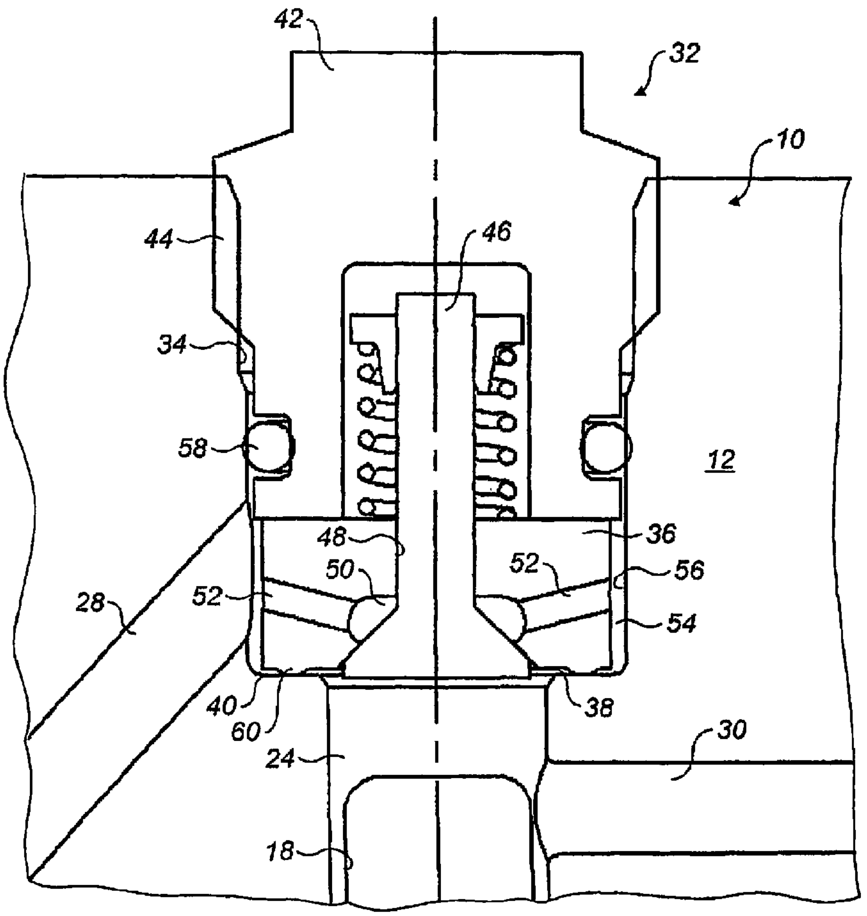
FIG. 1a PRIOR ART
FIG. 1*a* is an enlarged view of an inlet valve arrangement of the pump head shown in FIG. 1.

The conical body 147 is housed within the pump head housing 110, adjacent to the pumping chamber 124, whilst the neck 151 extends from the conical body 147, coaxially with the plunger bore 118, away from the pumping chamber 124. The neck 151 is slidable within a valve bore 148 defined by the upper portion 112 of the pump head housing 110. Consequently, the inlet valve member 146 is guided by the pump head housing 112 itself at the lower end of the neck 151. In this configuration, therefore, the pump head housing 112 serves as the inlet valve body 36 of FIGS. 1 and 1*a* of the prior art. In other words, in the present embodiment, the inlet valve body of the inlet valve arrangement 136 of the prior art is integrated into the pump head.

The neck 151 of the inlet valve member 146 extends beyond the inlet valve bore 148, and out from an upper surface 153 of the pump head housing 110. The upper surface 153 of the pump head housing 153 is planar and substantially flat. In this configuration, a proximal end 155 of the neck 151 (adjacent to the conical body 147) remains within the pump head housing 110, whilst a distal end 157 of the neck 151 remains outside the pump head housing 110 and carries a spring seat 159. A valve return spring 163 is provided between the upper surface 153 of the pump head housing 110 and the spring seat 159 to urge the inlet valve member 151 closed against a valve seat 161 when fuel pressure within the gallery 150 drops below a predetermined level. Although not shown in FIGS. 2 and 2*a*, a slight recess may be provided in the otherwise flat upper surface 153 of the pump head housing 110 to locate the lower end of the spring 163.

A closure member in the form of a valve cap 142 is mounted on top of and, thus, externally to, the upper surface 153 of the pump head housing 110. The valve cap 142 is provided over the distal end 157 of the neck 151 of the inlet valve member 146 (i.e. the part of the inlet valve member 146 that is outside the pump head housing 110). The valve cap 142 is generally top-hat-shaped, i.e. comprising a dome 162 with an annular flange 164 extending radially outwards from the dome 162. The dome 162 is located over the part of the inlet valve member 146 that is external to the pump head housing 110, whilst the annular flange 164 lies flush against the upper surface 153 of the pump head housing 110. The valve cap 142 is secured to the pump head housing 110 using suitable fixing means (not shown), for example screws or bolts, that extend through apertures 166 provided in the annular flange 164. The screws or bolts that pass through the apertures 166 into the pump head housing 110 are conveniently the same fixings that are used to attach the pump head housing to the main pump body (not shown). Beneficially, therefore, no separate fixing means is required to secure the valve cap 142 to the pump head housing 110.

In this configuration, the valve cap 142 defines an external chamber 168 within which the distal end 157 of the valve member 146 is housed. The external chamber 168 communicates with the gallery 150 defined in the pump head housing 110, and acts as the feeding annulus 54 of the pump head of FIG. 1, as described in further detail below.

An entry drilling 128 and a plurality of radial feed drillings 152 (only one of which is shown in FIG. 2) are provided in the upper portion 112 of the pump head housing 110. The entry drilling 128 extends to and opens at the upper surface 153 of the pump head housing 110, and so communicates with the external chamber 168. The radial feed drillings 152 also communicate with the external chamber 168, and extend between the gallery 150 and the upper surface 153 of the pump head housing 110, emerging at a position on the upper surface 153 of the pump head housing 110 which is outside the diameter of the spring 163. The radial feed drillings 152 are equally spaced about the circumference of the gallery 150. In use, low-pressure fuel is pumped along the entry drilling 128 and into the external chamber 168. The low-pressure fuel is then fed from the external chamber 168, through the radial feed drillings 152 in the pump head housing 110, and into the gallery 150. Once sufficient pressure is built in the gallery 150, the valve member 146 is urged away from its seat 161, against the spring force, to allow fuel into the pumping chamber 124.

Although for some applications, in order to ensure adequate flow rate into the pumping chamber 124, several radial drillings 152 may be required to define a flow path between the external chamber 168 and the gallery 150, because the drillings 152 are formed in the bulk of the pump head housing 110 no loss of rigidity occurs. Because the drillings 152 are provided in the bulk of the pump head housing 110 this also enables a greater plurality of drillings to be provided, if required, without compromise to the rigidity of the structure. A further benefit of the invention, over that in the prior art U.S. Pat. No. 7,363,913, is that the spring 163 is not in the flow path for fuel between the external chamber 168 and the gallery 150 (and hence the pumping chamber 124) because the radial drillings 152 communicate with the external chamber 168 at a position outside the spring diameter, with the spring 163 being located entirely external to the pump head housing 110. In U.S. Pat. No. 7,363,913 the flow of fuel into the radial drillings that feed the pumping chamber passes through the spring, which can give rise to cavitation and erosion problems, as well as contributing a resistance to fuel flow.

A low-pressure seal 158, for example an O-ring or gasket, is provided between the valve cap 142 and the upper surface 153 of the pump head housing 110. However, the need for a high-pressure seal is eliminated in the invention because the low-pressure feed chamber 168 is provided by the valve cap 142, which is externally-mounted on the pump head housing, thereby eliminating any potential leakage paths between high and low pressure regions. This arrangement removes one source of potential leakage, and one source of high structural stress, which enables higher pressures to be achieved in the pump head. In addition, manufacturing is simplified and costs are reduced because there is no need to machine a low-pressure feed chamber within the pump head housing 110, and there is less need for complicated and expensive stress-reduction geometries and surface finishes. Furthermore, by integrating the inlet valve body with the pump head housing 110, the number of parts is reduced, and the possibility of leakage is reduced further. The pump head has high pump performance in terms of both fuel flow and pressure, because the valve member 146 is guided by the pump head housing 110.

It will be appreciated that many modifications can be made to the components described above without departing from the inventive concept. For example, the valve member does not necessarily require a conical body: in alternative embodiments of the invention, the body may be spherical or any other suitable shape with the corresponding valve seat being suitably shaped.

Furthermore, whilst the upper flat surface 153 shown in FIGS. 2 and 2*a* is flat, in alternative embodiments of the invention, the upper surface may be defined by a raised portion or projection on the upper portion of the pump head housing. Referring to FIG. 3, in which similar parts to those described previously are denoted with like reference numerals, the pump head housing 110 includes a raised portion or projection 112*a* that is substantially circular, and projects into, and fits the footprint of, the dome 162 of the cap 142. The dome 162 may be fitted over the raised portion 112*a* such that the raised potion protrudes into the dome in a manner similar to a plug and socket arrangement. The projection therefore serves to locate the cap 142 on the pump head housing 110, which may be convenient for manufacturing purposes.

The radially outer surface of the projection 112*a* faces, and engages, a radially inner surface of the valve cap 142. The external chamber 168 is therefore defined between the internal surface of the dome 162, and the upper surface of the raised portion 112*a*. In this configuration, the low pressure seal 158 is provided between the radial internal surface of the dome 162 and the radial outer surface of the raised portion 112*a*, for example by an O-ring 170 surrounding the raised portion 112*a*. The O-ring 170 is located within an annular groove 171 provided in the radially outer surface of the raised portion 112*a* and serves to minimise the loss of fuel from the external chamber 168.

Although the provision of the raised portion 112*a* slightly complicates the machining process for the pump head housing 110, it provides the additional benefit that the cap 142 is located on the pump head housing 110. The apertures 166 in the cap 142 can therefore be aligned more readily with passages 172 through the pump head housing which receive the fixing means for the main pump body also.

The invention claimed is:

1. A pump head for a fuel pump for use in a common rail fuel injection system, the pump head comprising:

a pump head housing;

a pumping chamber defined within the pump head housing; and an inlet valve arrangement for controlling fuel flow into the pumping chamber, the inlet valve arrangement including a valve member moveable in a bore defined in the housing, said bore configured to guide the valve member at an elongate neck of the valve member, said valve member moveable between open and closed positions in response to fuel pressure within a gallery, wherein the gallery communicates with an external chamber defined by a closure member in the form of a hollow cap mounted externally to the pump head housing, such that, in use, the gallery communicates with the external chamber via a first passage defined in the housing and a source of low-pressure fuel communicates with the external chamber via a second passage defined in the housing, wherein all of the fuel flowing between the first passage and the second passage must flow through the interior of the hollow cap, wherein the pump head housing defines a projection which locates the closure member on the projection.

2. A pump head as claimed in claim 1, wherein a radially outer surface of the projection engages with a radially inner surface of the closure member to locate the closure member on the projection.

3. A pump head as claimed in claim 2, wherein an O-ring seal is located in a groove provided in the radially outer surface of the projection to provide a seal against fuel flow out of the external chamber.

4. A pump head as claimed in any claim 3, further comprising a low-pressure supply passage for conveying low-pressure fuel from the source to the external chamber, wherein the low-pressure supply passage is defined, in part, within the projection.

5. A pump head as claimed in claim 1, wherein the valve member is guided within a valve bore defined in the pump head housing.

6. A pump head as claimed in claim 5, wherein the valve member engages with a valve seat defined by the valve bore to control fuel flow between the external chamber and the pumping chamber.

7. A pump head as claimed in claim 1, wherein the projection of the pump head housing is provided with at least one fuel path to provide a flow path for fuel between the external chamber and the gallery.

8. A pump head as claimed in claim 7, wherein the at least one fuel path is provided by at least one drilling in the projection.

9. A pump head as claimed in claim 7, wherein the valve member is biased into the closed position by a spring engaged between an end portion of the valve member and an upper surface of the projection.

10. A pump head as claimed in claim 1, further comprising:

a spring which acts on the valve member to urge the valve member into the closed position in which fuel is unable to flow into the pumping chamber, and at least one fuel path between the external chamber and the gallery, wherein the at least one fuel path opens at a surface of the pump head housing outside the diameter of the spring.

11. A pump head as claimed in claim 10, wherein the valve member is guided within a valve bore defined in the pump head housing.

12. A pump head as claimed in claim 11, wherein the valve member engages with a valve seat defined by the valve bore to control fuel flow between the external chamber and the pumping chamber.

13. A pump head as claimed in claim 10, wherein the gallery is defined within the pump head housing.

14. A fuel pump for use in a common rail fuel injection system, wherein the fuel pump includes at least one pump head as defined in claim 10.

15. A fuel pump for use in a common rail fuel injection system, the fuel pump comprising:

a main pump housing;

a pump head having a pump head housing, a pumping chamber defined within the pump head housing and an inlet valve arrangement for controlling fuel flow into the pumping chamber, the inlet valve arrangement including a valve member moveable in a bore defined in the housing, said bore configured to guide the valve member at an elongate neck of the valve member, said valve member moveable between open and closed positions in response to fuel pressure within a gallery, wherein the gallery communicates with an external chamber, and a closure arrangement in the form of a hollow cap externally mounted to the pump head housing to define the external chamber, whereby, in use, the gallery communicates with the external chamber via a first passage defined in the housing and a source of low-pressure fuel communicates with the external chamber via a second passage defined in the housing, wherein all of the fuel flowing between the first passage and the second passage must flow through the interior of the hollow cap;

the fuel pump further comprising a fixing arrangement for fixing the pump head to the main pump housing, said fixing arrangement being adapted to fix the closure arrangement to the pump head also.

16. A fuel pump as claimed in claim 15, wherein the external chamber is defined, at least in part, by a closure member mounted to an external surface of the pump head housing.

17. A fuel pump as claimed in claim 16, wherein the closure member is provided with at least one aperture for receiving a fixing element of the fixing arrangement.

18. A fuel pump as claimed in claim 17, wherein the pump head housing is provided with a passage for receiving the fixing element, the fixing element extending into the main pump housing to affix the pump head housing thereto.

* * * * *